(12) United States Patent
Yang (10) Patent No.: US 9,169,903 B2
(45) Date of Patent: Oct. 27, 2015

(54) TRANSMISSION WHEEL SYSTEM SERIES WITH PERIODICALLY VARIED SPEED RATIO AND HAVING RECIPROCALLY DISPLACING AUXILIARY PULLEY FOR STORING/RELEASING KINETIC ENERGY

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 233 days.

(21) Appl. No.: 13/717,995

(22) Filed: Dec. 18, 2012

(65) Prior Publication Data

US 2014/0171239 A1  Jun. 19, 2014

(51) Int. Cl.
| | |
|---|---|
| F16H 55/30 | (2006.01) |
| F16H 55/36 | (2006.01) |
| F16H 9/04 | (2006.01) |
| B62M 1/10 | (2010.01) |
| B62M 9/08 | (2006.01) |
| B62M 9/00 | (2006.01) |

(52) U.S. Cl.
CPC ............... *F16H 9/04* (2013.01); *B62M 1/105* (2013.01); *B62M 9/08* (2013.01); *B62M 9/085* (2013.01); *B62M 2009/002* (2013.01)

(58) Field of Classification Search
CPC ..... F16H 9/04; F16H 30/02; F16H 2035/003; F16H 7/08; B62M 9/08; B62M 9/085; B62M 2009/002
USPC ..................................................... 474/71, 141
See application file for complete search history.

(56) References Cited

U.S. PATENT DOCUMENTS

| | | | | |
|---|---|---|---|---|
| 528,145 A | * | 10/1894 | Carr .................................. | 474/84 |
| 528,956 A | * | 11/1894 | Lippy et al. .................... | 280/238 |
| 529,267 A | * | 11/1894 | Homan .......................... | 474/141 |
| 591,488 A | * | 10/1897 | McMullin ........................ | 474/81 |
| 596,289 A | * | 12/1897 | Smith ............................. | 474/141 |
| 599,211 A | * | 2/1898 | Williams ....................... | 474/141 |
| 611,170 A | * | 9/1898 | Howard ......................... | 474/134 |
| 613,756 A | * | 11/1898 | Buddle .......................... | 474/141 |
| 618,094 A | * | 1/1899 | Hess ............................... | 74/413 |
| 885,982 A | * | 4/1908 | Delacroix ..................... | 474/136 |
| 2,155,108 A | * | 4/1939 | Ware ............................... | 74/25 |
| 2,277,458 A | * | 3/1942 | Schultze ....................... | 474/134 |
| 2,876,616 A | * | 3/1959 | Austin, Jr. et al. ................ | 57/91 |
| 2,994,216 A | * | 8/1961 | Morton .......................... | 68/140 |
| 3,259,398 A | * | 7/1966 | Hattan .......................... | 280/236 |
| 3,375,022 A | * | 3/1968 | Hattan .......................... | 280/238 |
| 3,396,988 A | * | 8/1968 | Kroening ................. | 280/93.502 |

(Continued)

OTHER PUBLICATIONS

European Communication under Rule 71(3) EPC dated Apr. 13, 2015, for EP 13198011.2.

*Primary Examiner* — Henry Liu
(74) *Attorney, Agent, or Firm* — Bacon & Thomas, PLLC (57) ABSTRACT

The present invention is to installed a unidirectional transmission at the active side, so when a transmission belt is tightened while the active pulley driving a passive pulley in periodically varied speed ratios, meanwhile an auxiliary pulley (312) is linked for storing energy to form a prestressed force, when the force applied by the active pulley to the passive pulley through the transmission belt is zero or relatively smaller, the auxiliary pulley (312) is enabled to release energy for recovering so as to apply force to the transmission belt, because the transmission belt is coupled to the active pulley and/or one end of the active wheel shaft combined with the active pulley is restrained by the unidirectional transmission device, the transmission belt is enabled to link the passive pulley to operate in the original revolving direction for feeding back the kinetic energy.

7 Claims, 4 Drawing Sheets

(56) References Cited

U.S. PATENT DOCUMENTS

| | | | |
|---|---|---|---|
| 3,648,542 A * | 3/1972 | Perotti et al. | 74/594.1 |
| 3,819,002 A * | 6/1974 | Heathwaite et al. | 180/227 |
| 3,831,978 A * | 8/1974 | Dunder et al. | 280/238 |
| 3,870,134 A * | 3/1975 | Anthamatten | 192/217.5 |
| 3,873,128 A * | 3/1975 | Dunder et al. | 280/236 |
| 3,899,932 A * | 8/1975 | Durham | 474/141 |
| 3,972,244 A * | 8/1976 | Bieser et al. | 474/17 |
| 4,103,563 A * | 8/1978 | Genzling | 74/594.5 |
| 4,159,652 A * | 7/1979 | Trammell, Jr. | 74/117 |
| 4,173,154 A * | 11/1979 | Sawmiller et al. | 474/88 |
| 4,181,034 A * | 1/1980 | Daniel | 474/141 |
| 4,193,324 A * | 3/1980 | Marc | 475/349 |
| 4,218,931 A * | 8/1980 | Tritenne | 474/165 |
| 4,501,576 A * | 2/1985 | Tanaka et al. | 474/141 |
| 4,522,610 A * | 6/1985 | Nagano | 474/141 |
| 4,816,009 A * | 3/1989 | Philipp | 474/69 |
| 4,850,939 A * | 7/1989 | Chilcote et al. | 474/49 |
| 4,865,577 A * | 9/1989 | Freudenstein | 474/141 |
| 4,976,348 A * | 12/1990 | Berry | 192/217.4 |
| 5,067,370 A * | 11/1991 | Lemmens | 74/594.2 |
| 5,078,026 A * | 1/1992 | Giffin | 74/594.4 |
| 5,611,556 A * | 3/1997 | Davidow | 280/236 |
| 5,882,025 A * | 3/1999 | Runnels | 280/259 |
| 5,899,477 A * | 5/1999 | Vergara | 280/261 |
| 6,293,884 B1 * | 9/2001 | Chattin | 474/160 |
| 6,371,874 B1 * | 4/2002 | Inoue | 474/156 |
| 6,840,136 B1 * | 1/2005 | Jones | 74/594.2 |
| 7,128,672 B2 * | 10/2006 | Chattin | 474/141 |
| 2007/0173361 A1 * | 7/2007 | Schuseil | 474/87 |
| 2007/0246908 A1 * | 10/2007 | Shu | 280/261 |
| 2009/0036244 A1 * | 2/2009 | Gravio | 474/156 |
| 2013/0130851 A1 * | 5/2013 | Yang | 474/71 |

* cited by examiner

TRANSMISSION WHEEL SYSTEM SERIES WITH PERIODICALLY VARIED SPEED RATIO AND HAVING RECIPROCALLY DISPLACING AUXILIARY PULLEY FOR STORING/RELEASING KINETIC ENERGY

BACKGROUND OF THE INVENTION (a) Field of the Invention

The present invention is to utilize an active pulley driven by a power source having unidirectional rotating output feature, or to install a unidirectional transmission device installed between the active pulley and a machine body or between an active wheel shaft combined with the active pulley and the machine body, so when a transmission belt is tightened while the active pulley driving a passive pulley in periodically varied speed ratios, meanwhile an auxiliary pulley (312) of an auxiliary pulley assembly for storing/releasing kinetic energy (700) is linked for storing energy to form a prestressed force, when the force applied by the active pulley to the passive pulley through the transmission belt is zero or relatively smaller, the auxiliary pulley (312) is enabled to release energy for recovering so as to apply force to the transmission belt, because the transmission belt is coupled to the active pulley and/or one end of the active wheel shaft combined with the active pulley is restrained by the unidirectional transmission device, the transmission belt is enabled to link the passive pulley to operate in the original revolving direction for feeding back the kinetic energy.

(b) Description of the Prior Art

A conventional transmission pulley set composed of an active chain wheel, a passive chain wheel and a transmission chain, or a transmission pulley set composed of an active tooth-shaped wheel, a passive tooth-shaped wheel, a tooth-shaped transmission belt or a tooth-shaped transmission chain both have features as followings: 1) a non-sliding synchronous transmission feature is formed between the active chain wheel and the passive chain wheel and the transmission chain, or between the active tooth-shaped wheel and the passive tooth-shaped wheel and the tooth-shaped transmission belt or the tooth-shaped transmission chain; (2) if the length of the transmission chain or the tooth-shaped transmission belt or the tooth-shaped transmission chain is changed during the operation or during switching the speed ratio, a prestressed auxiliary idle wheel is often installed for randomly adjusting the tightness of the transmission chain, the tooth-shaped transmission belt or the tooth-shaped transmission chain, however, the tightness of transmission chain would be periodically varied during the operation, so the prestressed mechanism of the auxiliary idle wheel for storing/releasing kinetic energy is reciprocally displaced for storing energy and releasing energy, wherein one disadvantage of the prior art is that the increased load generated at the active side while the transmission chain pressing the auxiliary idle wheel cannot be fed back as a kinetic driving energy.

SUMMARY OF THE INVENTION

The present invention discloses a driving device composed of an active pulley, a transmission belt and a passive pulley; the transmission wheel series is characterized in: (1) when the active pulley and the passive pulley are both formed as a noncircular synchronous transmission pulley, or (2) when one or both of the active pulley and the passive pulley are formed as a circular pulley and the other is formed as a noncircular synchronous transmission pulley, during each revolving period, the tightness of the transmission belt installed between the active pulley and the passive pulley is varied periodically, wherein the active pulley driven by a power source having unidirectional rotating output feature, or a unidirectional transmission device installed between the active pulley and a machine body or between an active wheel shaft combined with the active pulley and the machine body, when the transmission belt is tightened while the active pulley driving the passive pulley in periodically varied speed ratios, meanwhile an auxiliary pulley of an auxiliary pulley assembly for storing/releasing kinetic energy is linked for storing energy to from a prestressed force, when the force applied by the active pulley to the passive pulley through the transmission belt is zero or relatively smaller, the auxiliary pulley is enabled to release energy for recovering so as to apply force to the transmission belt, because the end of the transmission belt coupled to the active pulley is restrained by the unidirectional transmission device, the transmission belt is enabled to link the passive pulley to operate in the original revolving direction for feeding back the kinetic energy.

BRIEF DESCRIPTION OF THE DRAWINGS

FIG. 7 is a schematic view illustrating the embodiment of the present invention in which the releasing segment of the transmission belt (100) of the passive pulley assembly (600)

being installed with the auxiliary pulley (312) having the inward to outward expanding prestress in the normal state.

DESCRIPTION OF MAIN COMPONENT SYMBOLS

100: Transmission belt
101: First crank
102: First treadle
103: First treadle shaft
111: Active wheel shaft
112: Bimodal elliptical active pulley
113: Circular active pulley
201: Second crank
202: Second treadle
203: Second treadle shaft
211: Passive wheel shaft
212: Circular passive pulley
213: Bimodal elliptical passive pulley
300: Unidirectional rotating transmission device
301: Auxiliary wheel press helve
302: Prestressed energy storing/releasing spring
303: Swing shaft of auxiliary wheel press helve
311: Auxiliary wheel shaft
312: Auxiliary pulley
413: Circular eccentric passive pulley
500: Active pulley assembly
600: Passive pulley assembly
700: Auxiliary pulley assembly for storing/releasing kinetic energy
800: Machine body

DETAILED DESCRIPTION OF THE PREFERRED EMBODIMENTS

Figure 1:
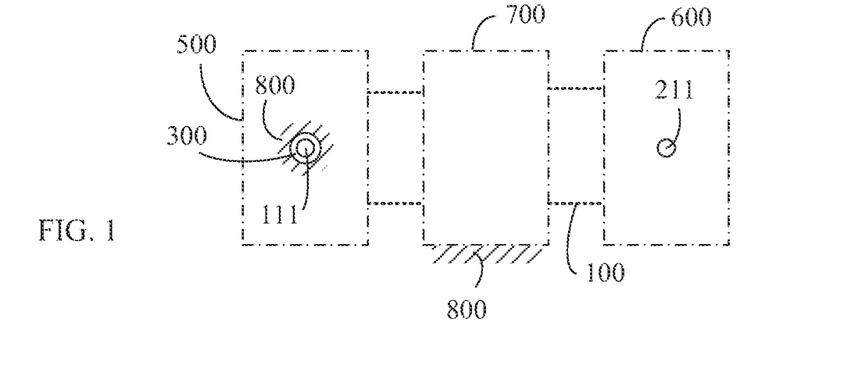
FIG. 1 is a schematic structural view of the present invention illustrating a unidirectional rotating transmission device (300) being installed between an active wheel shaft (111) and a machine body (800) for linking a passive pulley through a transmission belt (100) so as to drive the passive pulley in the original rotating direction while an auxiliary pulley (312) releasing energy for recovering.

A conventional transmission pulley set composed of an active chain wheel, a passive chain wheel and a transmission chain, or a transmission pulley set composed of an active tooth-shaped wheel, a passive tooth-shaped wheel, a tooth-shaped transmission belt or a tooth-shaped transmission chain both have features as followings: 1) a non-sliding synchronous transmission feature is formed between the active chain wheel and the passive chain wheel and the transmission chain, or between the active tooth-shaped wheel and the passive tooth-shaped wheel and the tooth-shaped transmission belt or the tooth-shaped transmission chain; (2) if the length of the transmission chain or the tooth-shaped transmission belt or the tooth-shaped transmission chain is changed during the operation or during switching the speed ratio, a prestressed auxiliary idle wheel is often installed for randomly adjusting the tightness of the transmission chain, the tooth-shaped transmission belt or the tooth-shaped transmission chain, however, the tightness of transmission chain would be periodically varied during the operation, so the prestressed mechanism of the auxiliary idle wheel for storing/releasing kinetic energy is reciprocally displaced for storing energy and releasing energy, wherein one disadvantage of the prior art is that the increased load generated at the active side while the transmission chain pressing the auxiliary idle wheel cannot be fed back as a kinetic driving energy;

The present invention is to utilize an active pulley driven by a power source having unidirectional rotating output feature, or to install a unidirectional transmission device installed between the active pulley and a machine body or between an active wheel shaft combined with the active pulley and the machine body, so when a transmission belt is tightened while the active pulley driving a passive pulley in periodically varied speed ratios, meanwhile an auxiliary pulley (312) of an auxiliary pulley assembly for storing/releasing kinetic energy (700) is linked for storing energy to form a prestressed force, when the force applied by the active pulley to the passive pulley through the transmission belt is zero or relatively smaller, the auxiliary pulley (312) is enabled to release energy for recovering so as to apply force to the transmission belt, because the transmission belt is coupled to the active pulley and/or one end of the active wheel shaft combined with the active pulley is restrained by the unidirectional transmission device, the transmission belt is enabled to link the passive pulley to operate in the original revolving direction for feeding back the kinetic energy;

The present invention discloses a driving device composed of an active pulley, a transmission belt and a passive pulley; the transmission wheel series is characterized in: (1) when the active pulley and the passive pulley are both formed as a noncircular synchronous transmission pulley, or (2) when one or both of the active pulley and the passive pulley are formed as a circular pulley and the other is formed as a noncircular synchronous transmission pulley, during each revolving period, the tightness of the transmission belt installed between the active pulley and the passive pulley is varied periodically, wherein the active pulley driven by a power source having unidirectional rotating output feature, or a unidirectional transmission device installed between the active pulley and a machine body or between an active wheel shaft combined with the active pulley and the machine body, when the transmission belt is tightened while the active pulley driving the passive pulley in periodically varied speed ratios, meanwhile an auxiliary pulley of an auxiliary pulley assembly for storing/releasing kinetic energy is linked for storing energy to from a prestressed force, when the force applied by the active pulley to the passive pulley through the transmission belt is zero or relatively smaller, the auxiliary pulley is enabled to release energy for recovering so as to apply force to the transmission belt, because the end of the transmission belt coupled to the active pulley is restrained by the unidirectional transmission device, the transmission belt is enabled to link the passive pulley to operate in the original revolving direction for feeding back the kinetic energy;

Several embodiments for illustrating the transmission wheel system with periodically varied speed ratio and having reciprocally displacing auxiliary pulley for storing/releasing kinetic energy provided by the present invention are as followings:

FIG. 1 is a schematic structural view of the present invention illustrating a unidirectional rotating transmission device (300) being installed between an active wheel shaft (111) and a machine body (800) for linking a passive pulley through a transmission belt (100) so as to drive the passive pulley in the original rotating direction while an auxiliary pulley (312) releasing energy for recovering;

As shown in FIG. 1, mainly consists of:

The transmission wheel series with periodically varied speed ratio and having reciprocally displacing auxiliary pulley for storing/releasing kinetic energy is provided with a non-releasing synchronous transmission relation between the transmission belt and the transmission wheel thereby forming a non-sliding synchronous transmission wheel set, the mentioned wheel set can be composed of a chain-shaped transmission belt and a chain wheel, or a tooth-shaped pulley and a tooth-shaped transmission belt; wherein:

- active pulley assembly (500): composed of an active wheel shaft (111), an active pulley and a unidirectional rotating transmission device (300), the active pulley is combined with the active wheel shaft (111), the active wheel shaft (111) is served to input the rotational kinetic energy, the unidirectional rotating transmission device (300) is installed between the active wheel shaft (111) and the machine body, the active pulley is composed of various transmission pulleys having different transmission radius and dimensions and formed in circular, or bimodal elliptical, or eccentric circular, or eccentric elliptical or eccentric bimodal elliptical shapes;
- passive pulley assembly (600): composed of a passive wheel shaft (211) and a passive pulley, the passive pulley is served to revolve on the passive wheel shaft (211), the passive pulley is composed of various transmission pulleys having different transmission radius and dimensions and formed in circular, or bimodal elliptical, or eccentric circular, or eccentric elliptical or eccentric bimodal elliptical shapes;
- transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;
- auxiliary pulley assembly for storing/releasing kinetic energy (700): installed with an auxiliary pulley (312), the mentioned auxiliary pulley (312) served for bearing the prestress applied by a prestressing device is disposed at the portion of the transmission belt (100) defined between the location where the passive pulley and the transmission belt (100) being ready to be synchronously combined and the location where the active pulley being released from the transmission belt (100); when the active pulley of the active pulley assembly (500) periodically drives the passive pulley of the passive pulley assembly (600), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the active pulley and the passive pulley to be linked in the original rotating direction so as to perform energy releasing drive; and with the disclosed structure, the speed ratio of driving the passive pulley is varied periodically.

The transmission wheel series with periodically varied speed ratio and having reciprocally displacing auxiliary pulley for storing/releasing kinetic energy of the present invention are applied extensively, and followings are several applications adopted in a treadle-drive bicycle or a fixed treadle-drive bicycle for exercising for further illustration.

Figure 2:
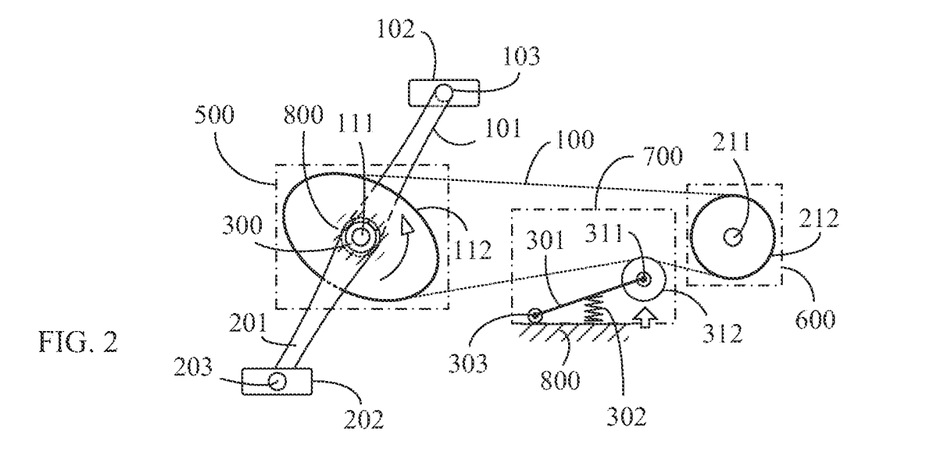
FIG. 2 is a schematic view illustrating the embodiment of the present invention in which an elliptical pulley installed with the unidirectional rotating transmission device (300) between the wheel shaft and the machine body being adopted as the active pulley and a circular pulley being adopted as the passive pulley, and a transmission belt and an auxiliary pulley being installed.

FIG. 2 is a schematic view illustrating the embodiment of the present invention in which an elliptical pulley installed with the unidirectional rotating transmission device (300) between the wheel shaft and the machine body being adopted as the active pulley and a circular pulley being adopted as the passive pulley, and a transmission belt and an auxiliary pulley being installed;

As shown in FIG. 2, mainly consists of:

bimodal elliptical active pulley (112): composed of a bimodal elliptical active pulley (112) (or a bimodal elliptical-like active pulley), installed with the active wheel shaft (111), the unidirectional rotating transmission device (300) is installed between the active wheel shaft (111) and the machine body (800), one side of the active wheel shaft (111) of the bimodal elliptical active pulley (112) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking a circular passive pulley (212) having a passive wheel shaft (211) through the transmission belt (100);

circular passive pulley (212): composed of a circular passive pulley (212) (or a circular-like passive pulley), served to be linked by the transmission belt (100) driven by the bimodal elliptical active pulley (112);

transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;

auxiliary pulley assembly for storing/releasing kinetic energy (700): installed with an auxiliary pulley (312), the mentioned auxiliary pulley (312) served for bearing the prestress applied by a prestressing device is disposed at the portion of the transmission belt (100) defined between the location where the circular passive pulley (212) and the transmission belt (100) being ready to be synchronously combined and the location where the bimodal elliptical active pulley (112) being released from the transmission belt (100); when the bimodal elliptical active pulley (112) periodically drives the circular passive pulley (212), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the bimodal elliptical active pulley (112) to be linked in the original rotating direction so as to perform energy releasing drive;

With the disclosed structure, when the first treadle (102) and the second treadle (202) are stepped for driving, the speed ratio between the bimodal elliptical active pulley (112) and the circular passive pulley (212) is varied periodically during each period of the stepping.

Figure 3:
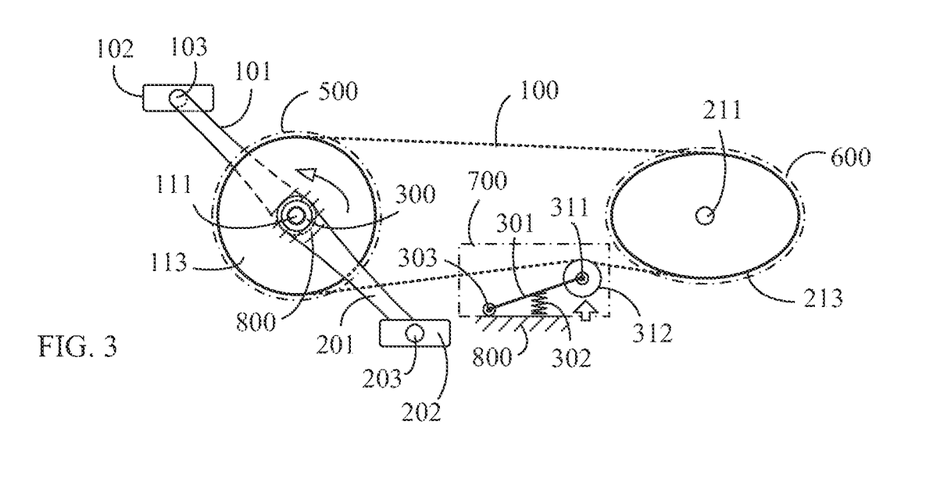
FIG. 3 is a schematic view illustrating the embodiment of the present invention in which a circular pulley installed with the unidirectional rotating transmission device (300) between the wheel shaft and the machine body being adopted as the active pulley and an elliptical pulley being adopted as the passive pulley, and a transmission belt and an auxiliary pulley being installed.

FIG. 3 is a schematic view illustrating the embodiment of the present invention in which a circular pulley installed with the unidirectional rotating transmission device (300) between the wheel shaft and the machine body being adopted as the active pulley and an elliptical pulley being adopted as the passive pulley, and a transmission belt and an auxiliary pulley being installed;

As shown in FIG. 3, mainly consists of:

circular active pulley (113): composed of a circular active pulley (113) (or a circular-like active pulley), installed with the active wheel shaft (111), the unidirectional rotating transmission device (300) is installed between the active wheel shaft (111) and the machine body (800), one side of the active wheel shaft (111) of the circular active pulley (113) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking a bimodal elliptical passive pulley (213) having a passive wheel shaft (211) through the transmission belt (100);

bimodal elliptical passive pulley (213): composed of a bimodal elliptical passive pulley (213) (or a bimodal elliptical-like passive pulley), linked by the transmission belt (100) driven by the circular active pulley (113);

transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;

auxiliary pulley assembly for storing/releasing kinetic energy (700): installed with an auxiliary pulley (312), the mentioned auxiliary pulley (312) served for bearing the prestress applied by a prestressing device is disposed at the portion of the transmission belt (100) defined between the location where the bimodal elliptical passive pulley (213) and the transmission belt (100) being ready to be synchronously combined and the location where the circular active pulley (113) being released from the transmission belt (100); when the circular active pulley (113) periodically drives the bimodal elliptical passive pulley (213), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the circular active pulley (113) and the bimodal elliptical passive pulley (213) to be linked in the original rotating direction so as to perform energy releasing drive;

With the disclosed structure, when the first treadle (102) and the second treadle (202) are stepped for driving, the speed ratio between the circular active pulley (113) and the bimodal elliptical passive pulley (213) is varied periodically during each period of the stepping.

Figure 4:
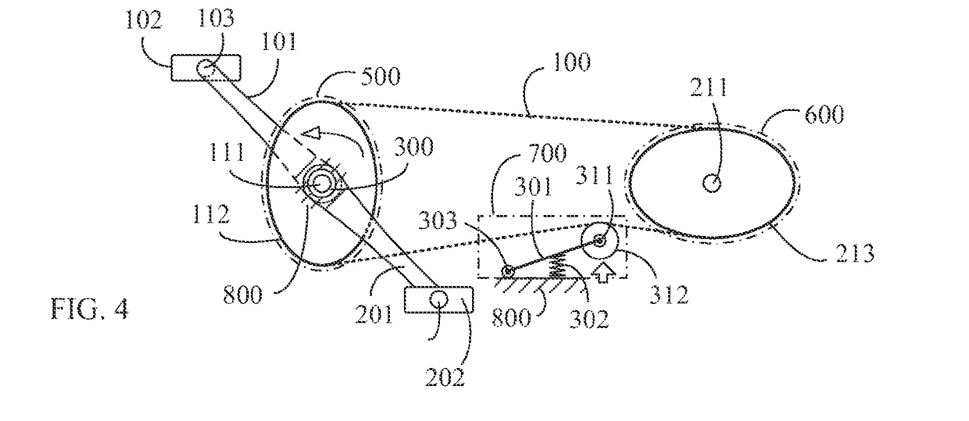
FIG. 4 is a schematic view illustrating the embodiment of the present invention in which the elliptical pulley installed with the unidirectional rotating transmission device (300) installed between the wheel shaft and the machine body being adopted as the active pulley and an elliptical pulley having 90 degree differentiation regarding to the active pulley being adopted as the passive pulley, and a transmission belt and an auxiliary pulley being installed.

FIG. 4 is a schematic view illustrating the embodiment of the present invention in which the elliptical pulley installed with the unidirectional rotating transmission device (300) installed between the wheel shaft and the machine body being adopted as the active pulley and an elliptical pulley having 90 degree differentiation regarding to the active pulley being adopted as the passive pulley, and a transmission belt and an auxiliary pulley being installed;

As shown in FIG. 4, mainly consists of:

bimodal elliptical active pulley (112): composed of a bimodal elliptical active pulley (112) (or a bimodal elliptical-like active pulley), installed with the active wheel shaft (111), the unidirectional rotating transmission device (300) is installed between the active wheel shaft (111) and the machine body (800), one side of the active wheel shaft (111) of the bimodal elliptical active pulley (112) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking a bimodal elliptical passive pulley (213) having a passive wheel shaft (211) through the transmission belt (100);

bimodal elliptical passive pulley (213): composed of a bimodal elliptical passive pulley (213) (or a bimodal elliptical-like passive pulley), linked by the transmission belt (100) driven by the circular active pulley (113);

transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;

auxiliary pulley assembly for storing/releasing kinetic energy (700): installed with an auxiliary pulley (312), the mentioned auxiliary pulley (312) served for bearing the prestress applied by a prestressing device is disposed at the portion of the transmission belt (100) defined between the location where the bimodal elliptical passive pulley (213) and the transmission belt (100) being ready to be synchronously combined and the location where the bimodal elliptical active pulley (112) being released from the transmission belt (100); when the bimodal elliptical active pulley (112) periodically drives the bimodal elliptical passive pulley (213), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the bimodal elliptical active pulley (112) and the bimodal elliptical passive pulley (213) to be linked in the original rotating direction so as to perform energy releasing drive;

With the disclosed structure, when the first treadle (102) and the second treadle (202) are stepped for driving, the speed ratio between the bimodal elliptical active pulley (112) and the bimodal elliptical passive pulley (213) is varied periodically during each period of the stepping.

Figure 5:
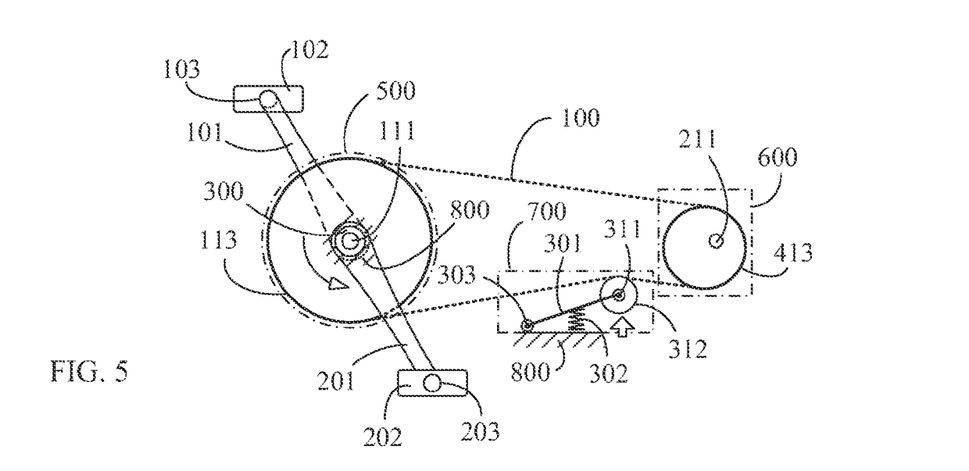
FIG. 5 is a schematic view illustrating the embodiment of the present invention in which the circular pulley installed with the unidirectional rotating transmission device (300) between the wheel shaft and the machine body being adopted as the active pulley and an eccentric circular pulley being adopted as the passive pulley, and a transmission belt and an auxiliary pulley being installed.

FIG. 5 is a schematic view illustrating the embodiment of the present invention in which the circular pulley installed with the unidirectional rotating transmission device (300) between the wheel shaft and the machine body being adopted as the active pulley and an eccentric circular pulley being adopted as the passive pulley, and a transmission belt and an auxiliary pulley being installed;

As shown in FIG. 5, mainly consists of:

circular active pulley (113): composed of a circular active pulley (113) (or a circular-like active pulley), installed with the active wheel shaft (111), the unidirectional rotating transmission device (300) is installed between the active wheel shaft (111) and the machine body (800), one side of the active wheel shaft (111) of the circular active pulley (113) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking an eccentric circular passive pulley (413) having a passive wheel shaft (211) through the transmission belt (100);

eccentric circular passive pulley (413): composed of an eccentric circular passive pulley (413) (or a eccentric circular-like passive pulley), linked by the transmission belt (100) driven by the circular active pulley (113);

transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;

auxiliary pulley assembly for storing/releasing kinetic energy (700): installed with an auxiliary pulley (312), the mentioned auxiliary pulley (312) served for bearing the prestress applied by a prestressing device is disposed at the portion of the transmission belt (100) defined between the location where the eccentric circular passive pulley (413) and the transmission belt (100) being ready to be synchronously combined and the location where the circular active pulley (113) being released from the transmission belt (100); when the circular active pulley (113) periodically drives the eccentric circular passive pulley (413), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the circular active pulley (113) and the eccentric circular passive pulley (413) to be linked in the original rotating direction so as to perform energy releasing drive;

With the disclosed structure, when the first treadle (102) and the second treadle (202) are stepped for driving, the speed ratio between the circular active pulley (113) and the eccentric circular passive pulley (413) is varied periodically during each period of the stepping.

According to the transmission wheel series with periodically varied speed ratio and having reciprocally displacing auxiliary pulley for storing/releasing kinetic energy, the structure of the prestressing device of the auxiliary pulley assembly for storing/releasing energy (700) is illustrated by following examples:

(1) One end of the auxiliary press helve (301) formed as a rigid and swingable support arm structure is swingably combined with the machine body (800), and a energy storing/releasing spring (302) with outward to inward prestress is installed between the above two, the other end thereof is installed with an auxiliary wheel shaft (311) for being installed with the auxiliary pulley (312); or (2) One end of the auxiliary wheel press helve having plate-shaped spring function is combined with the machine body (800) for replacing the auxiliary wheel press helve (301) and the prestressed energy storing/releasing spring (302), the other end of the auxiliary wheel press helve having plate-shaped spring function is installed with the auxiliary wheel shaft (311), the auxiliary pulley (312) is enabled to receive the outward to inward prestress applied by the auxiliary wheel press helve having plate-shaped spring function.

Figure 6:
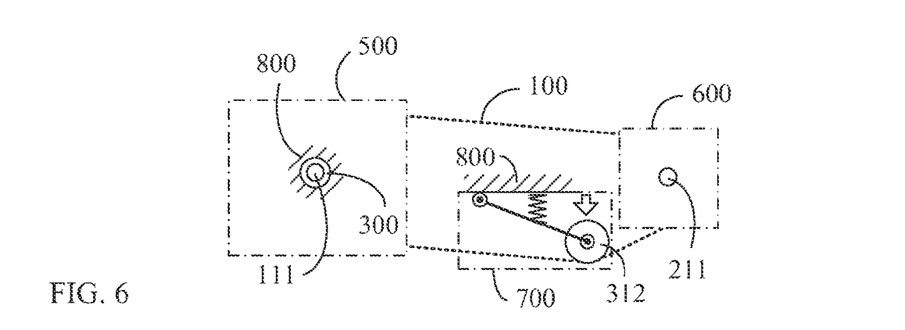
FIG. 6 is a schematic view illustrating the embodiment of the present invention in which the ready into combining segment of the transmission belt (100) of the passive pulley assembly (600) is installed with the auxiliary pulley (312) having the inward to outward expanding prestress in the normal state.

According to the transmission wheel series with periodically varied speed ratio and having reciprocally displacing auxiliary pulley for storing/releasing kinetic energy, the structure of the auxiliary pulley assembly for storing/releasing kinetic energy (700) is illustrated as followings:

FIG. 6 is a schematic view illustrating the embodiment of the present invention in which the ready into combining segment of the transmission belt (100) of the passive pulley assembly (600) is installed with the auxiliary pulley (312) having the inward to outward expanding prestress in the normal state;

As shown in FIG. 6, the main structure is that the ready into combining segment of the transmission belt (100) of the passive pulley assembly (600) is installed with the auxiliary pulley (312) having the inward to outward expanding prestress in the normal state.

Figure 7:
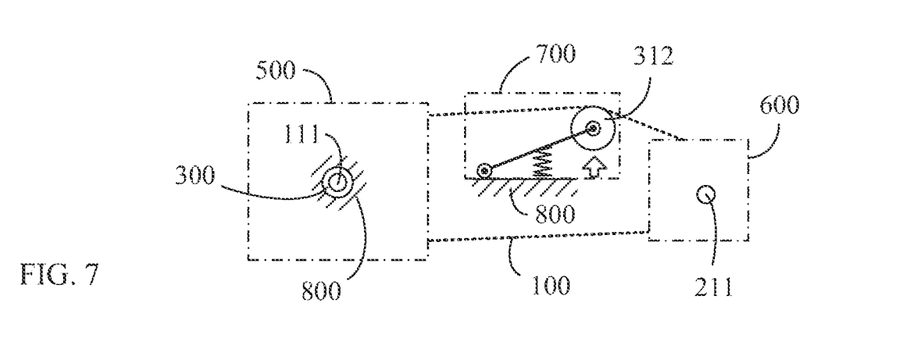

FIG. 7 is a schematic view illustrating the embodiment of the present invention in which the releasing segment of the transmission belt (100) of the passive pulley assembly (600) being installed with the auxiliary pulley (312) having the inward to outward expanding prestress in the normal state;

As shown in FIG. 7, the releasing segment of the transmission belt (100) of the passive pulley assembly (600) is installed with the auxiliary pulley (312) having the inward to outward expanding prestress in the normal state.

Figure 8:
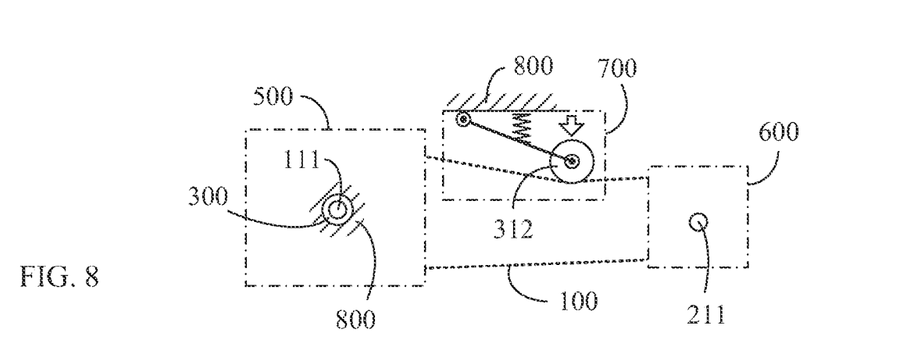
FIG. 8 is a schematic view illustrating the embodiment of the present invention in which the releasing segment of the transmission belt (100) of the passive pulley assembly (600) being installed with the auxiliary pulley (312) having the outward to inward expanding prestress in the normal state.

FIG. 8 is a schematic view illustrating the embodiment of the present invention in which the releasing segment of the transmission belt (100) of the passive pulley assembly (600) being installed with the auxiliary pulley (312) having the outward to inward expanding prestress in the normal state;

As shown in FIG. 8, the releasing segment of the transmission belt (100) of the passive pulley assembly (600) is installed with the auxiliary pulley (312) having the outward to inward expanding prestress in the normal state.

Figure 9:
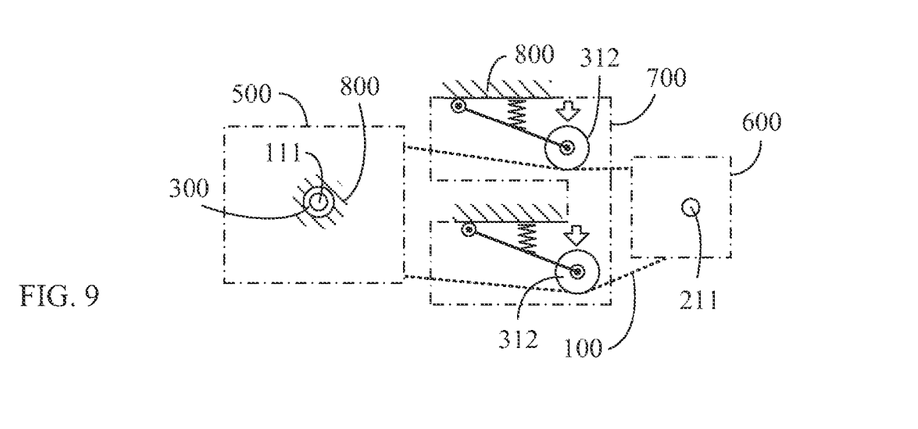
FIG. 9 is a schematic view illustrating the embodiment of the present invention in which the releasing segment of the transmission belt (100) of the passive pulley assembly (600) being installed with the auxiliary pulley (312) having the outward to inward expanding prestress in the normal state, and the ready into combining segment of the transmission belt (100) of the passive pulley assembly (600) being installed with the auxiliary pulley (312) having the inward to outward expanding prestress in the normal state.

FIG. 9 is a schematic view illustrating the embodiment of the present invention in which the releasing segment of the transmission belt (100) of the passive pulley assembly (600) being installed with the auxiliary pulley (312) having the outward to inward expanding prestress in the normal state, and the ready into combining segment of the transmission belt (100) of the passive pulley assembly (600) being installed with the auxiliary pulley (312) having the inward to outward expanding prestress in the normal state;

As shown in FIG. 9, the releasing segment of the transmission belt (100) of the passive pulley assembly (600) is installed with the auxiliary pulley (312) having the outward to inward expanding prestress in the normal state, and the ready into combining segment of the transmission belt (100) of the passive pulley assembly (600) is installed with the auxiliary pulley (312) having the inward to outward expanding prestress in the normal state.

Figure 10:
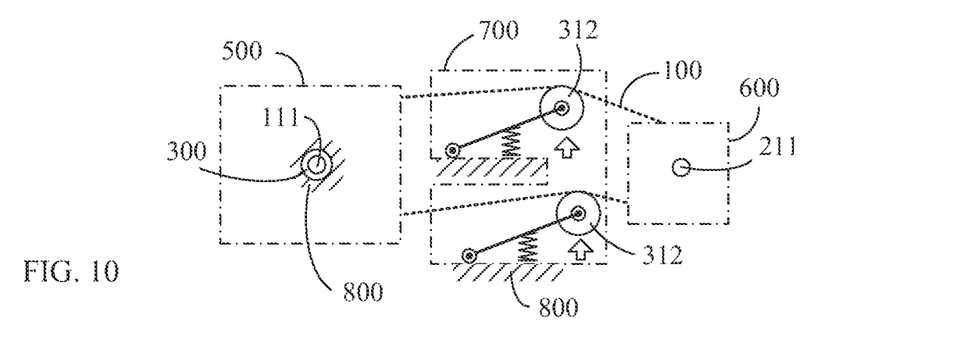
FIG. 10 is a schematic view illustrating the embodiment of the present invention in which the releasing segment of the transmission belt (100) of the passive pulley assembly (600) being installed with the auxiliary pulley (312) having the inward to outward expanding prestress in the normal state, and the ready into combining segment of the transmission belt (100) of the passive pulley assembly (600) being installed with the auxiliary pulley (312) having the outward to inward expanding prestress in the normal state.

FIG. 10 is a schematic view illustrating the embodiment of the present invention in which the releasing segment of the transmission belt (100) of the passive pulley assembly (600) being installed with the auxiliary pulley (312) having the inward to outward expanding prestress in the normal state, and the ready into combining segment of the transmission belt (100) of the passive pulley assembly (600) being installed with the auxiliary pulley (312) having the outward to inward expanding prestress in the normal state;

As shown in FIG. 10, the releasing segment of the transmission belt (100) of the passive pulley assembly (600) is installed with the auxiliary pulley (312) having the inward to outward expanding prestress in the normal state, and the ready into combining segment of the transmission belt (100) of the passive pulley assembly (600) is installed with the auxiliary pulley (312) having the outward to inward expanding prestress in the normal state.

Figure 11:
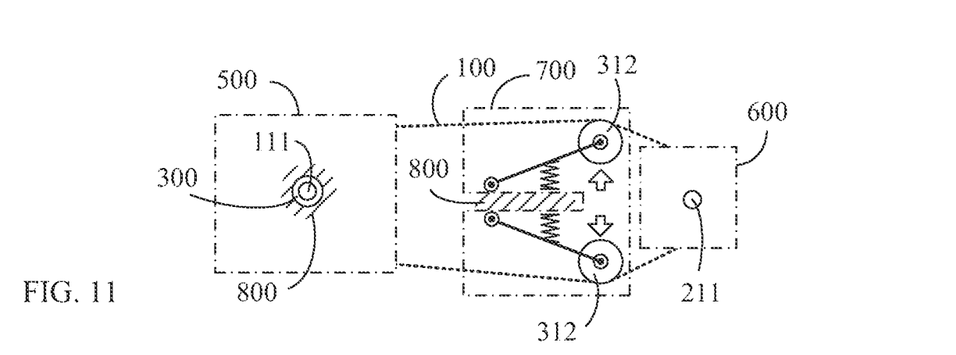
FIG. 11 is a schematic view illustrating the embodiment of the present invention in which the releasing segment of the transmission belt (100) of the passive pulley assembly (600) being installed with the auxiliary pulley (312) having the inward to outward expanding prestress in the normal state, and the ready into combining segment of the transmission belt (100) of the passive pulley assembly (600) being installed with the auxiliary pulley (312) having the inward to outward expanding prestress in the normal state.

FIG. 11 is a schematic view illustrating the embodiment of the present invention in which the releasing segment of the transmission belt (100) of the passive pulley assembly (600) being installed with the auxiliary pulley (312) having the inward to outward expanding prestress in the normal state, and the ready into combining segment of the transmission belt (100) of the passive pulley assembly (600) being installed with the auxiliary pulley (312) having the inward to outward expanding prestress in the normal state;

As shown in FIG. 11, the releasing segment of the transmission belt (100) of the passive pulley assembly (600) is installed with the auxiliary pulley (312) having the inward to outward expanding prestress in the normal state, and the ready into combining segment of the transmission belt (100) of the passive pulley assembly (600) is installed with the auxiliary pulley (312) having the inward to outward expanding prestress in the normal state.

Figure 12:
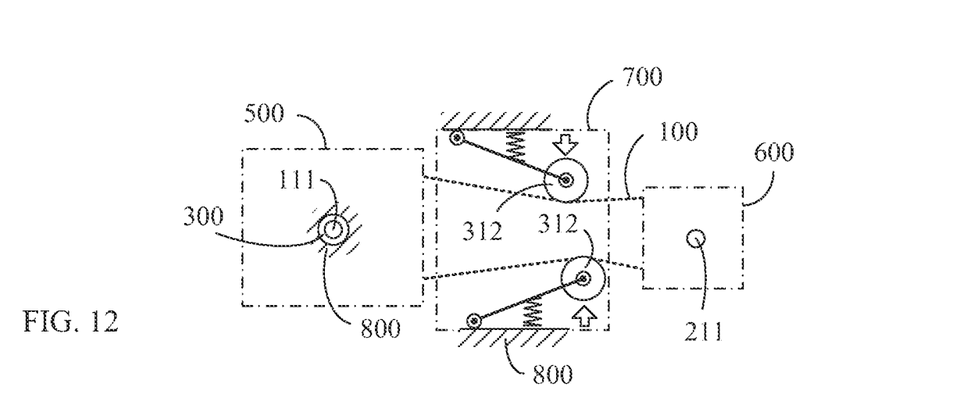
FIG. 12 is a schematic view illustrating the embodiment of the present invention in which the releasing segment of the transmission belt (100) of the passive pulley assembly (600) being installed with the auxiliary pulley (312) having the outward to inward expanding prestress in the normal state, and the ready into combining segment of the transmission belt (100) of the passive pulley assembly (600) being installed with the auxiliary pulley (312) having the outward to inward expanding prestress in the normal state.

FIG. 12 is a schematic view illustrating the embodiment of the present invention in which the releasing segment of the transmission belt (100) of the passive pulley assembly (600) being installed with the auxiliary pulley (312) having the outward to inward expanding prestress in the normal state, and the ready into combining segment of the transmission belt (100) of the passive pulley assembly (600) being installed with the auxiliary pulley (312) having the outward to inward expanding prestress in the normal state;

As shown in FIG. 12, the releasing segment of the transmission belt (100) of the passive pulley assembly (600) is installed with the auxiliary pulley (312) having the outward to inward expanding prestress in the normal state, and the ready into combining segment of the transmission belt (100) of the passive pulley assembly (600) is installed with the auxiliary pulley (312) having the outward to inward expanding prestress in the normal state.

The invention claimed is:

1. A transmission device (300) having a transmission wheel series with periodically varied speed ratio comprising:
    an active pulley assembly (500) driven by a power source, said active pulley assembly (500) comprising an active wheel shaft (111), an active pulley (112, 113) and a unidirectional rotating transmission device (300), wherein said active pulley (112, 113) is combined with said active wheel shaft (111), said active wheel shaft (111) being configured to input rotational kinetic energy to a machine, said unidirectional rotating transmission device (300) being installed between the active wheel shaft (111) and the machine or between the active pulley assembly (500) and the machine, wherein said active pulley (112, 113) comprises at least one pulley formed in one of a circular, or bimodal elliptical, or eccentric circular, or eccentric elliptical or eccentric bimodal elliptical shape;
    a passive pulley assembly (600) comprising a passive wheel shaft (211) and a passive pulley (212, 213, 413), said passive pulley (212, 213, 413) being configured to revolve on the passive wheel shaft (211), wherein said passive pulley (212, 213, 413) comprises at least one pulley formed in one of a circular, or bimodal elliptical, or eccentric circular, or eccentric elliptical or eccentric bimodal elliptical shape;

a transmission belt (100) comprising a chain or a tooth-shaped transmission belt for linking the active pulley assembly (500) and the passive pulley assembly (600), wherein the wheel set comprises at least one of a chain-shaped transmission belt and a chain wheel, or a tooth-shaped pulley and a tooth-shaped transmission belt; and an auxiliary pulley assembly (700) configured to store and release kinetic energy comprising a reciprocally displacing auxiliary pulley (312) for storing and releasing kinetic energy and an auxiliary wheel press helve (301) having one end coupled to the machine and the other end coupled to the auxiliary pulley (312), said auxiliary wheel press helve (301) comprises at least one of a plate-shaped helve having a spring function, a swingable support arm structure, and/or a prestressed energy storing and releasing spring installed between the press helve and the machine, wherein said auxiliary pulley (312) is configured to bear prestress force to a portion of the transmission belt (100) between the passive pulley (212, 213, 413) and a location where the active pulley (112, 113) is released from the transmission belt (100) so that when the active pulley of the active pulley assembly periodically drives the passive pulley of the passive pulley assembly at varied speed ratios, a tightness of the transmission belt is varied correspondingly, wherein:

when the transmission belt (100) is gradually tightened during a rotation of the active pulley (112, 113) to drive the passive pulley (212, 213, 413), the auxiliary wheel press helve (301) is displaced for storing energy by having the transmission belt bear against the auxiliary pulley, and when the transmission belt (100) is gradually loosened during the driving of the passive pulley (212, 213, 413) by the active pulley (112, 113) so that when force applied by the active pulley (112, 113) to the passive pulley (212, 213, 413) is zero or lower than a force applied during the tightening of the transmission belt, the auxiliary wheel press helve (301) is configured to have an energy releasing displacement to bear the auxiliary pulley (312) against the portion of the transmission belt near the passive pulley to pull the active pulley (112, 113) and the passive pulley (212, 213, 413) in the original rotating direction by the rotational direction restraining of the unidirectional rotating transmission device (300) so as to perform an energy releasing drive for feeding back the kinetic energy, wherein the speed ratio of driving the passive pulley is varied periodically, and wherein the transmission wheel series with periodically varied speed ratio is configured so that a non-releasing synchronous transmission relation is formed between the transmission belt and the active pulley assembly and the passive pulley assembly to form a non-sliding synchronous transmission wheel set.

2. A treadle-drive bicycle or a fixed treadle-drive bicycle for exercising having the transmission device having a transmission wheel series with periodically varied speed ratio according to claim 1, wherein the active pulley is a biomodal elliptical active pulley installed with the active wheel shaft, wherein the passive pulley is a circular pulley or a circular-like pulley linked to the biomodal elliptical active pulley by the transmission belt, wherein one side of said wheel shaft of said biomodal elliptical active pulley is driven by a first crank linked by a first treadle revolving on a first treadle shaft for performing revolving driving, and wherein the other side of said wheel shaft of said biomodal elliptical active pulley is driven by a second crank linked by a second treadle revolving on a second treadle shaft for performing the revolving driving, and wherein when the first treadle and the second treadle are stepped for driving, the speed ratio between the bimodal elliptical active pulley and the circular passive pulley is varied periodically during each period of the stepping.

3. A treadle-drive bicycle or a fixed treadle-drive bicycle for exercising having the transmission wheel series with periodically varied speed ratio according to claim 1, wherein the active pulley is a circular or a circular-like active pulley installed with the active wheel shaft, wherein the passive pulley is a biomodal elliptical pulley linked to the circular active pulley by the transmission belt, wherein one side of said wheel shaft of said circular active pulley is driven by a first crank linked by a first treadle revolving on a first treadle shaft for performing revolving driving, and wherein the other side of said wheel shaft of said circular active pulley is driven by a second crank linked by a second treadle revolving on a second treadle shaft for performing the revolving driving, and wherein when the first treadle and the second treadle are stepped for driving, the speed ratio between the circular active pulley and the biomodal elliptical passive pulley is varied periodically during each period of the stepping.

4. A treadle-drive bicycle or a fixed treadle-drive bicycle for exercising having the transmission wheel series with periodically varied speed ratio according to claim 1, wherein the active pulley is a biomodal elliptical or an elliptical-like active pulley installed with the active wheel shaft, wherein the passive pulley is a biomodal elliptical or an elliptical-like pulley having 90 degree differentiation with respect to the active pulley and linked to the circular active pulley by the transmission belt, wherein one side of said wheel shaft of said bimodal elliptical active pulley is driven by a first crank linked by a first treadle revolving on a first treadle shaft for performing revolving driving, and wherein the other side of said wheel shaft of said biomodal elliptical active pulley is driven by a second crank linked by a second treadle revolving on a second treadle shaft for performing the revolving driving, and wherein when the first treadle and the second treadle are stepped for driving, the speed ratio between the bimodal elliptical active pulley and the biomodal elliptical passive pulley is varied periodically during each period of the stepping.

5. A treadle-drive bicycle or a fixed treadle-drive bicycle for exercising having the transmission wheel series with periodically varied speed ratio according to claim 1, wherein the active pulley is a circular or circular-like active pulley (113) installed with the active wheel shaft (111), wherein the passive pulley is an eccentric circular pulley (413) linked to the circular active pulley (113) by the transmission belt (100), wherein one side of said wheel shaft (111) of said circular active pulley is driven by a first crank (101) linked by a first treadle (102) revolving on a first treadle shaft (103) for performing revolving driving, and wherein the other side of said wheel shaft (111) of said circular active pulley (113) is driven by a second crank (201) linked by a second treadle (202) revolving on a second treadle shaft (203) for performing the revolving driving, and wherein when the first treadle and the second treadle are stepped for driving, the speed ratio between the circular active pulley and the eccentric passive pulley is varied periodically during each period of the stepping.

6. The transmission wheel series with periodically varied speed ratio according to any of the preceding claims, wherein said auxiliary press helve (301) is formed as a rigid and swingable support arm structure having one end swingably coupled with the machine and the other end thereof installed with an auxiliary wheel shaft for being installed with the auxiliary pulley (312), and comprises the energy storing/releasing spring (302) with outward to inward prestress installed between the auxiliary press helve and the machine; or wherein said auxiliary press helve has a plate-shaped spring function, said auxiliary press helve having one end combined with the machine and the other end installed with the auxiliary wheel shaft and the auxiliary pulley, so that the auxiliary pulley is enabled to receive the outward to inward prestress applied by the auxiliary wheel press helve having plate-shaped spring function.

7. The transmission wheel series with periodically varied speed ratio according to any of the preceding claims 1 to 5, wherein the auxiliary pulley assembly for storing/releasing kinetic energy is configured according to at least one of the following structures:

a combining segment of the transmission belt is installed with the auxiliary pulley having an inward to outward expanding prestress in the normal state; or a releasing segment of the transmission belt is installed with the auxiliary pulley having an inward to outward expanding prestress in the normal state; or a releasing segment of the transmission belt is installed with the auxiliary pulley having an outward to inward expanding prestress in the normal state; or a releasing segment of the transmission belt is installed with the auxiliary pulley having an outward to inward expanding prestress in the normal state, and a combining segment of the transmission belt is installed with a second auxiliary pulley having an inward to outward expanding prestress in the normal state; or a releasing segment of the transmission belt is installed with the first auxiliary pulley having an inward to outward expanding prestress in the normal state, and a combining segment of the transmission belt is installed with a second auxiliary pulley having an outward to inward expanding prestress in the normal state; or a releasing segment of the transmission belt is installed with the first auxiliary pulley having an inward to outward expanding prestress in the normal state, and a combining segment of the transmission belt is installed with a second auxiliary pulley (312) having an inward to outward expanding prestress in the normal state; or a releasing segment of the transmission belt is installed with the auxiliary pulley having the outward to inward expanding prestress in the normal state, and a combining segment of the transmission belt is installed with a second auxiliary pulley having an outward to inward expanding prestress in the normal state.

\* \* \* \* \*